(12) United States Patent
van der Linde

(10) Patent No.: US 7,326,137 B2
(45) Date of Patent: Feb. 5, 2008

(54) GEAR FOR A BICYCLE

(76) Inventor: Petrus Maria van der Linde, Bergvennenweg 35, Lattrop (NL) 7635 NJ ( * ) Notice: Subject to any disclaimer, the term of this patent is extended or adjusted under 35 U.S.C. 154(b) by 290 days.

(21) Appl. No.: 10/333,523

(22) PCT Filed: Jul. 19, 2001

(86) PCT No.: PCT/NL01/00551

§ 371 (c)(1),
(2), (4) Date: Jun. 13, 2003

(87) PCT Pub. No.: WO02/08050

PCT Pub. Date: Jan. 31, 2002

(65) Prior Publication Data

US 2004/0014543 A1    Jan. 22, 2004

(30) Foreign Application Priority Data

Jul. 21, 2000   (NL) .................................. 1015777

(51) Int. Cl.
*F16H 61/00* (2006.01)
(52) U.S. Cl. ...................................................... 474/80
(58) Field of Classification Search ............... 474/69, 474/73, 77, 78, 80, 81, 82, 83
See application file for complete search history.

(56) References Cited

U.S. PATENT DOCUMENTS 625,835 A * 5/1899 Davis ........................... 74/349
5,404,768 A * 4/1995 Hwang et al. ................. 74/371
5,553,510 A   9/1996 Balhorn ........................ 74/354
5,607,171 A * 3/1997 Labranche ................ 280/288.1
5,611,556 A * 3/1997 Davidow ..................... 280/236

FOREIGN PATENT DOCUMENTS

| CH | 128353 | 10/1928 |
|----|--------|---------|
| DE | 494177 | 3/1930 |
| DE | 3908385 | 6/1990 |
| DE | 41 29 198 | 3/1993 |
| EP | 0 761 529 | 3/1997 |
| EP | 761529 A1 * | 3/1997 |
| GB | 444433 | 3/1936 |

* cited by examiner

*Primary Examiner*—Vicky A. Johnson
(74) *Attorney, Agent, or Firm*—Michaelson & Associates; Peter L. Michaelson

(57) ABSTRACT

The invention relates to a compact installation gear with, for instance, a ⅜" derailleur chain and a derailleur for setting a transmission ratio between a crankshaft and a rear hub of a bicycle. To that end, the gear comprises a compact housing with the crankshaft included therein, with a slidable driving first sprocket engaging, via the derailleur chain, a selected second sprocket which forms part of a series of second sprockets mutually different in diameter, located on a secondary shaft with a third sprocket mounted thereon outside the housing, which, in turn, via a roller chain, drives a fourth sprocket on the rear hub. The transmission ratio can be set with the aid of the derailleur by moving the derailleur chain over the different second sprockets while at the same time moving the driving first sprocket to a position directly opposite the selected second sprocket.

18 Claims, 4 Drawing Sheets

GEAR FOR A BICYCLE

The invention relates to a gear for setting a transmission ratio between a crankshaft and a rear hub of a bicycle.

From practice, a gear is known wherein a sprocket cassette, located on a rear hub and containing a number of sprockets of different diameter, is driven via a bicycle chain by a sprocket fixedly mounted on a crankshaft. To obtain a desired transmission ratio between the crankshaft and the rear hub, the bicycle chain is moved between the different sprockets on the rear hub with the aid of a derailleur, located near the rear hub. To that end, the derailleur comprises a chain tensioner with two guiding wheels, over which and between which the bicycle chain is guided. By means of two parallel arms, these guiding wheels can be positioned directly opposite each of the respective sprockets, thus moving the part of the bicycle chain between the guiding wheels and the sprockets in a parallel manners.

A drawback of the known gear is that the sprocket cassette and the derailleur take up a lot of space on and near the rear hub. As a result, the rear wheel has to be spoked in an asymmetrical manner, at the expense of the stability and strength of this rear wheel. Furthermore, it is difficult to screen, the arrangement from moisture an dirt.

The invention aims to provide a gear wherein the drawbacks of the known gear are avoided, while its advantages are maintained. To that end, a gear according to the invention is character by the features of claim 1.

By moving the series of sprockets and the derailleur from the rear hub to a secondary h near the crankshaft, a very compact gear is obtained. Due to the limited dimensions, this gear can be readily provided with a protective housing. Furthermore, on the rear hub, a single fourth sprocket can suffice. Thus, space is created to spoke the rear wheel in a symmetrical manner, so that an even loading of the spokes and the wheel rim is obtained, which is of benefit to the strength and stability of the rear wheel.

As the driving first sprocket can move in axial direction on the crankshaft, a very compact derailleur can be built, while optional use is made of the space between cranks mounted on both sides on the crankshaft. With this derailleur, a gear can be realised which fits between the cranks and which hardly projects on either side of the frames.

With a derailleur according to the invention, the driving first sprocket can in each case be positioned directly opposite the second sprocket to be driven. The first roller chain therefore lies in line between these sprockets, so that this roller chain is only loaded in longitudinal direction, which is favorable to its life span. Moreover, as no kinks or curves have to be compensated in the roller chain, a very short chain suffices, so that the distance between the crankshaft and the secondary shaft can be reduced. In this manner, an even more compact gear is obtained.

The freedom of choice in diameter of the driving first and third sprockets and the driven second and fourth sprockets, offers the possibility to optimize aspects of the gear while maintaining a desired transmission ratio between the crankshaft and the rear hub. An aspect to be optimized can be, for instance, the dimensions of the gear. For a more compact gear, the diameter of the driving third sprocket on the secondary shaft can be selected to be relatively small, so that the distance between the secondary shaft and the crankshaft can be reduced. To compensate this smaller driving third sprocket, the diameter of the driving first sprocket can be increased and/or the diameters of the fourth sprocket on the rear hub and/or the second sprockets on the secondary shaft can be reduced in order to still maintain a sufficiently large transmission ratio between the crankshaft and the rear hub.

In a comparable manner, other aspects can be optimized such as the operation of the derailleur, which can be improved by selecting the difference in diameter between successive second sprockets to be small, or the forces on the secondary shaft, which can be reduced by reducing the second and third sprockets mounted thereon.

The transmission range of the gear and the step size between the successive transmission ratios is determined by the amount of gearing of the second sprockets as well as by the difference in the number of teeth between the successive second sprockets. Thus, either a large transmission range with relatively large steps between the successive transmission ratios or a smaller transmission range with a finer adjustment possibility Ban be realised Hence, with the choice of the second sprockets, the gear can be adjusted to the demands of various types of bicycles and riding situations.

With a narrow roller chain, the second sprockets on the secondary shaft can be positioned closer together so that a still narrower gear can be obtained. However, it is also possible to install more second sprockets while the width of the gear remains the same, so that the number of speed options of the gear increases.

Due to the compact construction, the gear can simply be enclosed in a housing. This protects the gear from external influences, such as moisture and dirt. It leads to less wear of the parts, less maintenance and a longer life span. Additionally, the housing offers the cyclist protection or instance with respect to slashing dirt and the risk of clothing getting caught between the moving parts. Further, the housing contributes constructively to the support of the driving parts, i.e. the crankshaft and the secondary shaft. These shafts can be bearing mounted in the housing in a simple manner. Finally, the housing facilitates the installation and attachment of the gear to the bicycle, the more so when the housing is fixedly mounted in the frame of the bicycle with a mounting bracket.

Due to the limited dimensions of the gear and the rigidity of the housing, the gear can be mounted in the bicycle frame in several positions, with the position of the crankshaft being substantially fixed while the position of the secondary shaft in relation to the crankshaft can be varied. As a result, the gear is suitable for installation in frames of various shapes and sizes.

BRIEF DESCRIPTION OF THE DRAWINGS

In clarification of the invention, an exemplary embodiment of a gear according to the invention as well as its operation and a method for installation of such a gear in a bicycle will be further elucidated on the basis of the drawing.

In the drawing.

DETAILED DESCRIPTION

Figure 1:
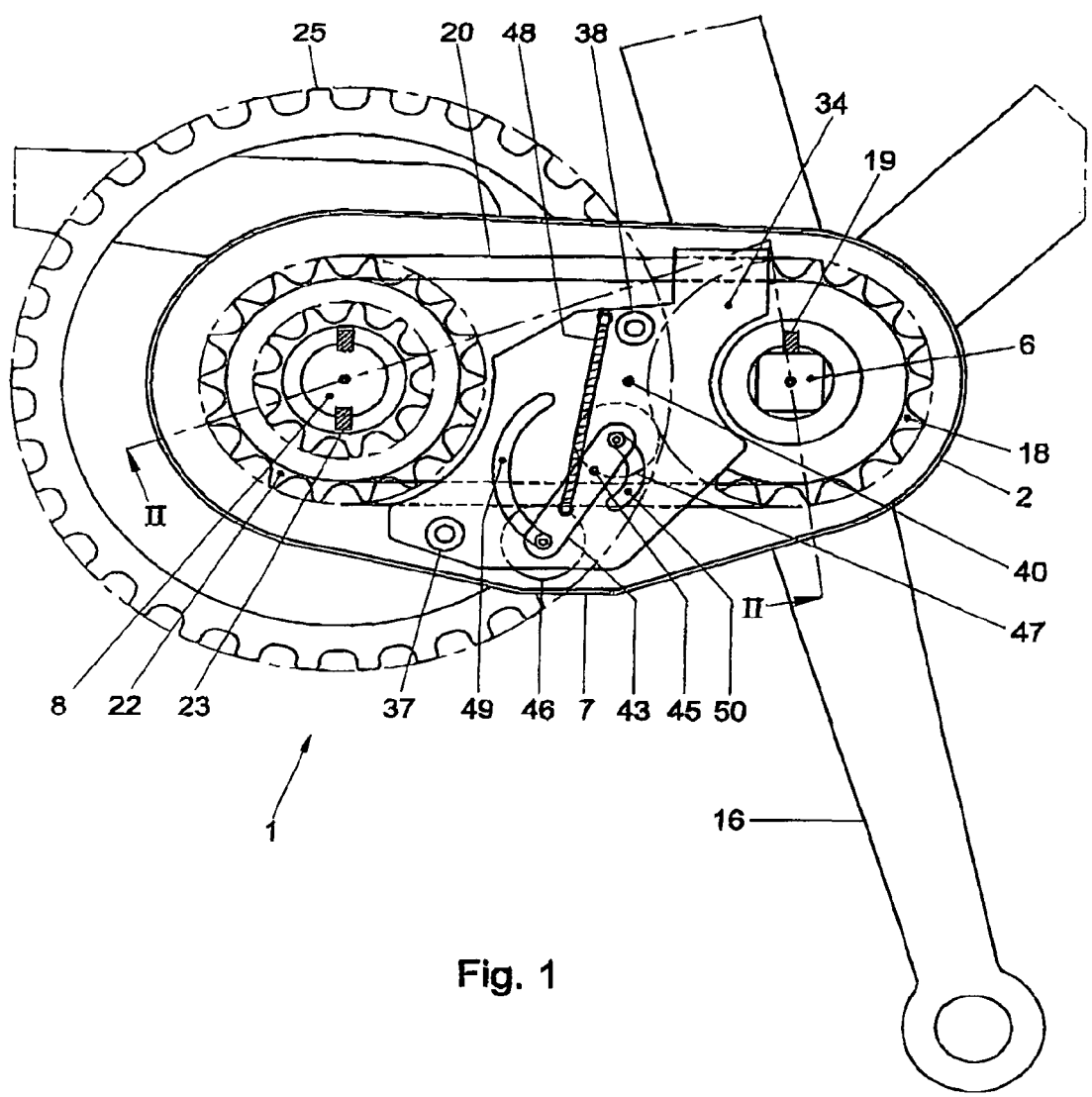
FIG. 1 shows, in side view, a cross section of a gear according to the invention at the line I-I in FIG. 2.
Figure 2:
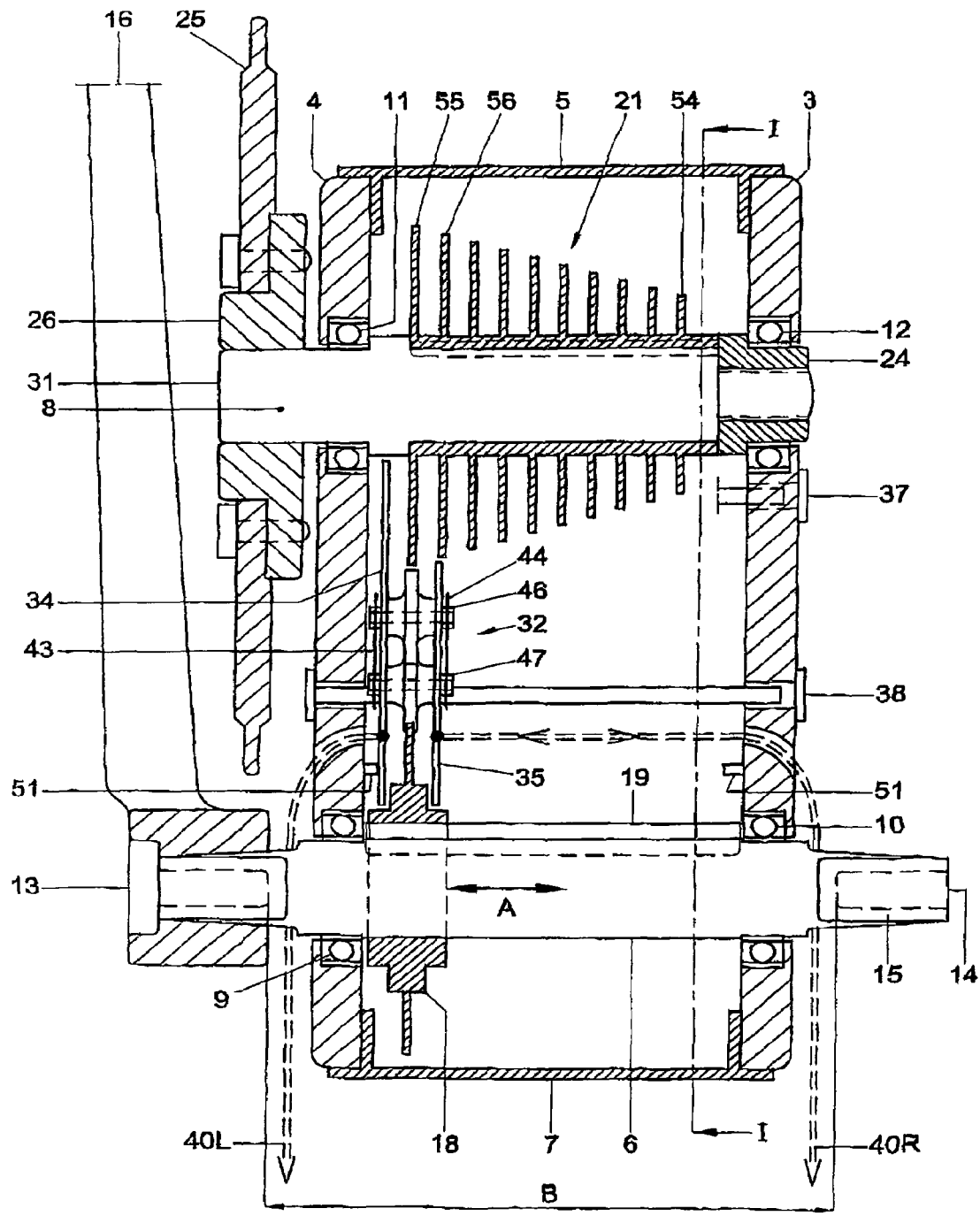
FIG. 2 shows, in top plan view, a cross section of the gear of FIG. 1 at the line II-II in FIG. 1.

FIGS. 1 and 2 show, in cross section, a side and top plan view, respectively, of a gear 1 which can be installed near a crankshaft 6 of a bicycle 30 between frame parts of that bicycle. With the gear 1, the transmission ratio between the crankshaft 6 driven by a cyclist and a rear hub 29 (see FIG. 5B), and hence the acceleration, can be adjusted to, inter alia, the riding conditions and the personal preference of the cyclist. What is meant hereinbelow by transmission ratio is the relation between the number of revolutions of a driving shaft and the number of revolutions of a driven shaft. What is meant by acceleration is the product of the transmission ratio between crankshaft and rear hub and the wheel diameter of the bicycle.

As shown in FIGS. 1 and 2, the gear 1 is included in a housing 2, comprising a first side plate 3 and a second side plate 4, which are mutual connected along their circumference by a mounting bracket 5. With this mounting bracket 5, the gear 1 can be mounted onto the bicycle, in a manner to be described hereinafter. Between the first side plate 3 and the second side plate 4, a crankshaft 6 is bearing-mounted by means of a first and a second ball bearing 9, 10. Parallel to the crankshaft 6, and at a relative short distance therefrom, a secondary shaft 8 is bearing-mounted in a third and a fourth ball bearing 11, 12, respectively. The secondary shaft 8 is driven by the crankshaft 6 by means of a first sprocket 18 on the crankshaft 6 which, via a first roller chain 20, is connected to a second sprocket 22 which forms part of a sprocket cassette 21 on the secondary shaft 8. The secondary shaft 8, in turn, drives a rear hub 29 by means of a third sprocket 25 which, via a second roller chain 27 (see FIG. 5B), engages a fourth sprocket on the rear hub 29.

Figure 5A:
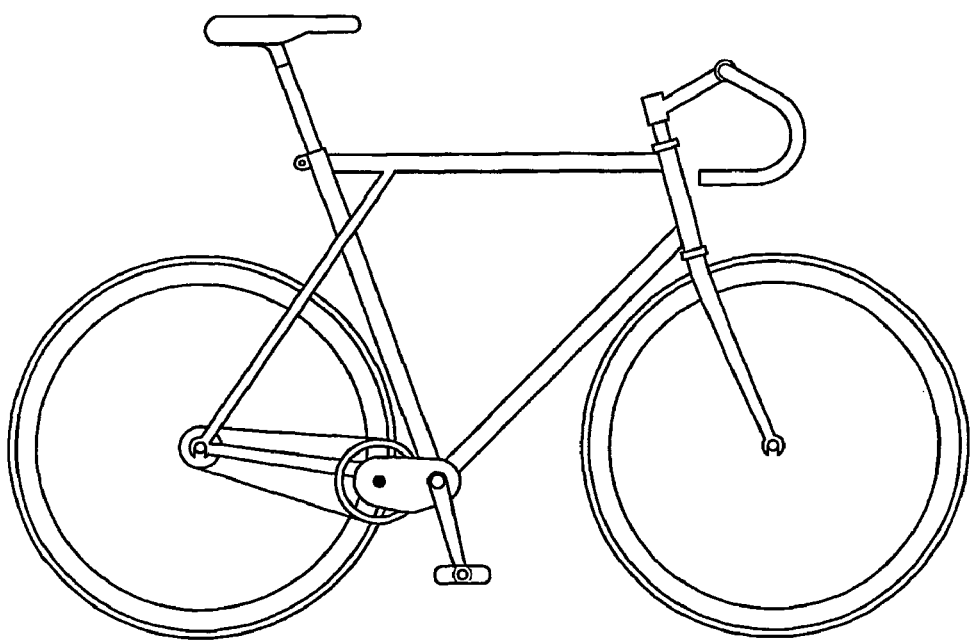
FIGS. 5A and 5B show two bicycles with possible installation positions of a gear according to the invention.
Figure 5B:
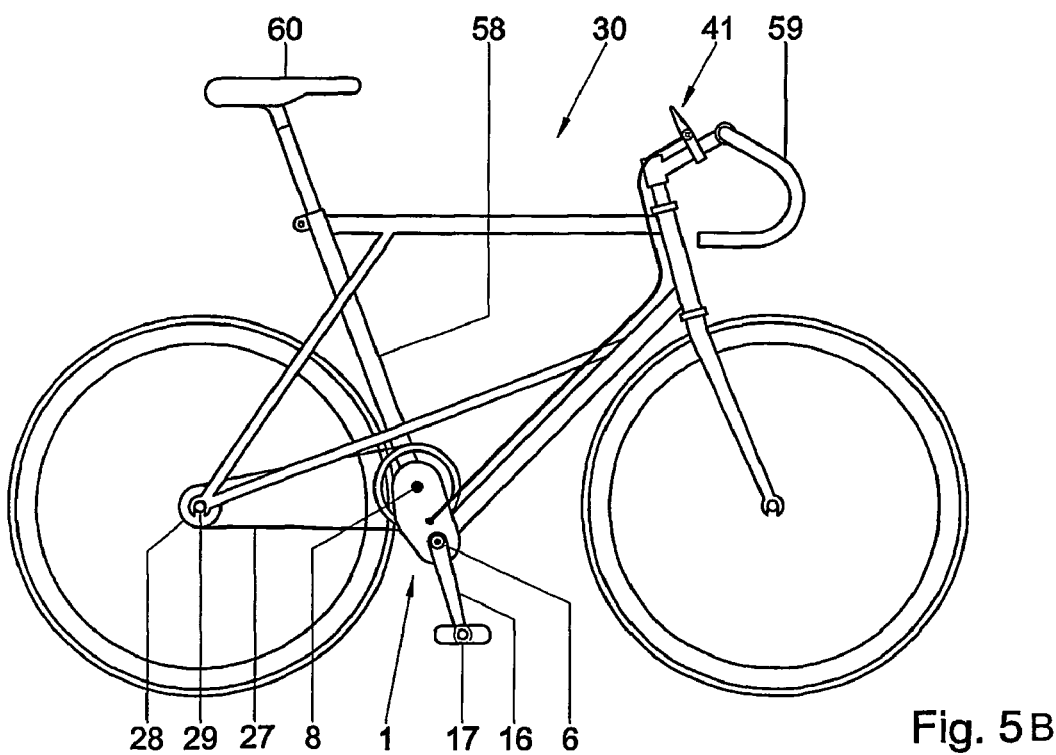

As shown in FIGS. 1 and 2, to drive the crankshaft 6, two ends 13, 14 of this crankshaft 6, reaching outside the housing 2, are connected in a manner known per se via cranks 16 to pedals (see FIGS. 5A and 5B, though not specifically referenced). The connection between the cranks 16 and the crankshaft ends 13, 14 (see FIGS. 1 and 2) is such that it can transmit the substantial forces applied by a cyclist to the pedals to the crankshaft 6. This can be done in a manner known per se, for instance by means of a key connection, or, as shown in FIGS. 1 and 2, by means of a keyless, form-closed connection, whereby the forces mentioned are transmitted via four levelled sides 15 of the tapered crankshaft ends 13, 14.

The driving first sprocket 18 is mounted on the crankshaft 6 with the aid of a key 19. To that end, the crankshaft 6 is provided with a keyway, while the first sprocket 18 is provided with a shaft hole such that it can move, guided by the key, in the axial direction of the crankshaft 6, as indicated by the arrow A in FIG. 2, but cannot rotate relative to this crankshaft 6. It will be directly clear that such a connection can also be brought about in another manner known from practice, for instance by means of a cam in the shaft hole of the first sprocket 18, which engages in an axially extending slot in the surface of the crankshaft 6, or by means of a key toothing, extending over the length of the crankshaft 6, and a cooperating shape of the shaft hole in the first sprocket 18.

The driving third sprocket 25 is fixedly mounted on an end 31 of the secondary shaft 8, for instance by means of a pulley 26, which end 31 extends through the second side plate 4 to outside the housing 2. Further, on this secondary shaft 8, a sprocket cassette 21 is mounted so as to be secured against rotation, by means of, for instance, a second key 23 and a clamping nut 24, as shown in FIG. 2. The sprocket cassette 21 comprises a series of second sprockets 22, with different diameters and different number of teeth, the latter between 11 and 24 teeth. The second sprockets 22 are arranged from large to small, the largest second sprocket 55 being preferably located near the driving third sprocket 25 to decrease the torsional forces on the secondary shaft 8.

The first roller chain 20, between the driving first sprocket 18 and a respective one of the second sprockets 22, has links of a length of, preferably, smaller than ½" (12.7 mm) and maximally ⅜" (9.5 mm) and an internal link width smaller than ⅛" (3.2 mm) and an external link width of of approximately 5⁄16" (7 mm). The space available widthwise for the gear 1 is determined by the distance B between the cranks 16, which distance varies per type of bicycle. By using a relatively narrow roller chain 20, more second sprockets 22 can be positioned within the limited width B, so that the number of possible transmission ratios increases.

For moving the roller chain 20 between the second sprockets 22, the gear 1 is provided with a derailleur 32. This derailleur 32 comprises a first, and, parallel thereto, a second plate 34, 35. These plates 34, 35 are movable along two guiding pins 37, 38, which are mounted parallel to the crankshaft 6 between the first and second side plates 3, 4 of the housing 2. The plates 34, 35 extend between the sprocket cassette 21 on the secondary shaft 8 and the crankshaft 6, while overlapping, at least partially, the driving first sprocket 18 on both sides. The mutual distance between the plates 34, 35 is such that, when moving the plates 34, 35 along the guiding pins 37, 38, the driving first sprocket 18 is moved along therebetween and therefore moves along the crankshaft 6, while, with the plates 34, 35 at a standstill, the driving first sprocket 18 can preferably rotate freely between the plates 34, 35. The plates 34, 35 of the derailleur 32 are connected, at the sides remote from each other, to a first end of an operating cable 40, which operating cables are connected at a second end to an operating handle 41 (see FIG. 5B) on or near the handlebar 59 of the 40R as shown in FIGS. 1 and 2), the plates 34, 35 and the first sprocket 18 located therebetween can be moved along the guiding pins 37, 38, respectively, and the crankshaft 6.

Figure 3A:
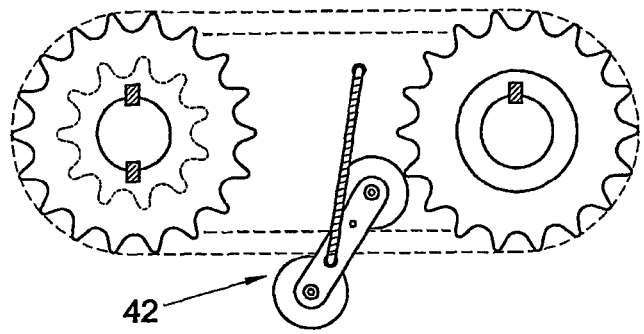
FIGS. 3A and 3B show, in side view, two positions of a chain tensioner of a derailleur according to FIGS. 1 and 2.
Figure 3B:
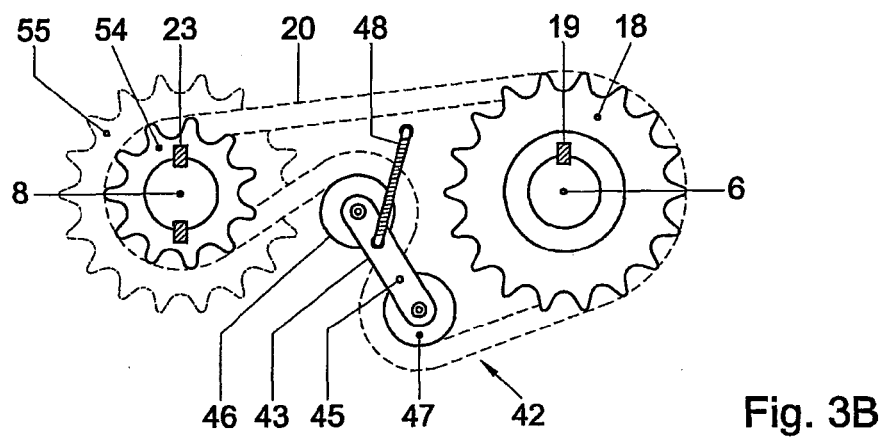

The derailleur is further provided with a chain tensioner 42 (see also FIGS. 3A and 3B), for accompanying the lateral movement of the roller chain 20 along the different second sprockets 22 and for compensating the occurring differences in necessary chain length. To that end, the chain tensioner 42 comprises two parallel arms 43, 44 which can swivel about a swivel pin 45, extending perpendicularly to the plates 34, 35. Between the ends of the swivelling arms 43, 44, a first and a second guiding wheel 46, 47 are rotatably suspended between the plates 34, 35. At some distance from the swivel pin 45, a draw spring 48 engages the two swiveling ads 43, 44, under the influence of which the chain 20, which is guided between the two guiding wheels 46, 47, is tensioned. In FIGS. 3A and 3B are shown two extreme positions of the chain tensioner 42, which occur when the roller chain 20 engages a second sprocket having a larger diameter 55 or a smaller diameter 54, respectively. In the first position (FIG. 3A), for instance, the full length of the roller chain 20 is needed to embrace the driving first sprocket 18 and the second sprocket 55. The chain tensioner 42 is in an extreme position, in which the draw springs 48 are stretched out and the roller chain 20 lies approximately stretched out between the guiding wheels 46, 47. In the second position (FIG. 3B), a shorter chain length suffices to embrace the driving first sprocket 18 and the second sprocket 54. Under the influence of the draw springs 48, the first guiding wheel 46 exerts an upward force and the second guiding wheel 47 a downward force on the roller chain 20, so that the excess length of the chain 20 is tensioned in an S-bend between the two guiding wheels 46, 47. Thus, the chain 20 remains under sufficient tension during its movement along and its cooperation with the different sprockets 22, 54, 55. The concept of chain tensioner 42 should, for that matter, be herein understood to mean a guiding element suitable for guiding and tensioning all types of chains that can be used between the driving first and one of the second sprockets 18, 22.

Due to the limited space between the plates 34, 35, the swivelling arms 48, 44 and the draw springs 48 are mounted on the outside of the plates 34, 35 in the example shown in FIGS. 1 and 2. Further, for the purpose of the path travelled by the guiding wheels 46, 47 during the guidance of the roller chain 20 between the two extreme sprocket positions, the plates 34, 35 are provided with two arcuate slots 49, 50.

Further, the derailleur 32 is preferably provided with limiting means 51, with which the stroke of the driving first sprocket 18 along the crankshaft 6 is limited. In this manner, the driving first sprocket 18 is prevented from being moved beyond the outermost two sprockets 54, 55. Such a limitation can, for instance, be formed by a projection or a different spacer between, on the one hand, the first side plate 3 and/or the second side plate 4 and, on the other hand, the plates 34, 35.

The operation of the gear 1 as described hereinabove is as follows. The starting position is, for instance, the position shown in FIG. 2, where the driving first sprocket 18 lies opposite the largest second sprocket 55, which corresponds to the smallest transmission ratio, that is, the lowest speed of the gear. In this position, the operating handle 41 will also be in an extreme position, so that the left operating cable $40_L$, shown in FIG. 2, cannot be pulled further to the left. Optionally, to this end, a limiting means 51 as already described above can be provided. If the operating handle 41 is moved in the opposite direction, corresponding to the pulling of the right-hand operating cable $40_R$, the two plates 34, 35 will move to the right along the guiding pins 37, 38, thereby also moving the driving first sprocket 18 along the crankshaft 6. Also the roller chain 20 is thereby pulled sideward so that, at a certain moment, a tooth of the largest sprocket but one 56 will engage a link of the roller chain 20, after which the other teeth and links follow. The chain length necessary for embracing the sprocket 56 is somewhat shorter than the length necessary for the sprocket 55. The difference in length is compensated in the manner described hereinabove by the chain tensioner 42. In this manner, the driving first sprocket 18 will be moved along the successive second sprockets 22 to the smallest second sprocket 54. Preferably, a limiting means 51 is built in at that side for preventing further movement of the driving first sprocket 18. By operating the handle 41 in the opposite direction, the driving fast sprocket 18 will move back in the direction of the largest sprocket 55 in the same manner as described hereinabove, except that in this case the necessary length of the roller chain will increase. The chain tensioner 42 will therefore, dog the movement of the sprocket 18 along the crankshaft 6, be moved from a position shown in FIG. 3b to a position shown in FIG. 3a.

Figure 4:
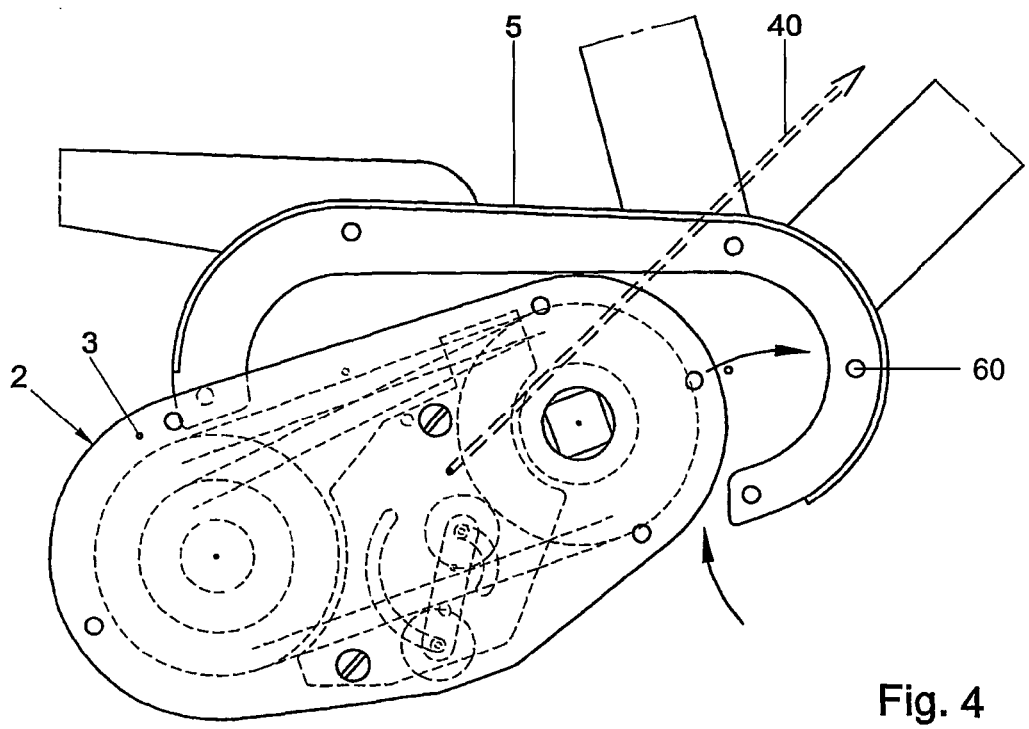
FIG. 4 shows a step of the installation process of a gear according to the invention.

FIG. 4 shows an example of how the gear 1 can be installed in a bicycle 30. The mounting bracket 5 is fixed to several bars of the bicycle fame, for instance by welding. This mounting bracket 5 is of a strong and rigid design which is such that it can absorb and transmit propelling forces to the rest of the bicycle frame. For instance, the bracket can be manufactured from steel, but, with a view to the reduction of weight, is preferably manufactured from aluminum, or plastic, or the like. After fitting the bracket 5, the first and second side plate 3, 4, having therebetween the crankshaft 6, the secondary shaft 8, the sprocket cassette 21 and the derailleur 32, can be slid as a whole into the mounting bracket 5. The bracket 5 and the housing plates 3, 4 are provided, at mutually corresponding positions, with holes 60 (only one of which is specifically referenced) with which the above parts can be mounted onto each other by means of bolts and nuts. Then, a cover 7 (see FIGS. 1 and 2) can be provided at the location of the interruption in the mounting bracket 5 (see FIG. 4) through which the gear has been slid in, so that, in mounted condition, a closed housing 2 is formed by the first side plate 3, the second side plate 4, the mounting bracket 5 and the cover 7. Naturally, the housing 2 with the bracket 5 can also be mounted in a bicycle in one go. Due to the housing 2, the gear 1 can be installed in a very simple manner. Additionally, the gear 1 is protected by the housing 2 from dirt, moisture and unforeseen external forces and the cyclist is protected, during use, from undesired contact with moving parts of the gear 1. Furthermore, the housing 2, especially the bracket 5, gives the construction the necessary rigidity and strength as has been indicated hereinabove. This autonomous rigidity and the limited dimensions of the gear 1 give the gear considerble freedom of installation. Although the position of the crankshaft 6 is substantially fixed, the position of the secondary shaft 8 can be varied. Two examples hereof are represented in FIGS. 5A and 5B. In FIG. 5A, viewed in the riding direction, the secondary shaft 8 is located proximate to an end of a frame tube extending from a saddle (shown but not specifically referenced) and behind the crankshaft 6, at approximately the same height as the crankshaft 6, while in FIG. 5B the secondary shaft 8 is located obliquely above the crankshaft 6, in line with a saddle tube. These different installation positions affect, inter alia, the orientation and length of the rear fork. Assuming that the rear fork is preferably mounted approximately parallel to the upper half of the second roller chain for obtaining the most favorable pressure load instead of bending load, a shortest possible rear fork can be realized in an installed position as shown in FIG. 5B, which may be desirable, for instance, for racing bikes. Due to the different installation possibilities, the gear 1 is therefore suitable for use in a large number of frames varying in shape and size.

Further, with a gear 1 according to the invention, the rear wheel of the bicycle can be symmetrically spoked, sinse the rear hub 29 only needs to be equipped with a single fourth sprocket 28, and moreover this sprocket 28 can be of limited dimension when the driving third sprocket 25 is suitably selected. This is in contrast to the known gears, wherein the second sprockets are located on the rear hub and take up such an amount of space there that the left and right-hand side of the rear wheel have to be provided with different spokes, which, moreover, have to be disposed in different positions. A symmetrically spoked wheel is stronger, more stable and has a longer life span since the forces acting on the wheel are evenly distributed over the spokes. Moreover, a symmetrical spoking is easier to provide.

It will be clear that the invention is not limited to the exemplary embodiments given in the description and the drawing. Many variations are possible within the scope of the invention as outlined by the claims.

For instance, the gear can be combined with an overdrive outside of the housing. To that end, an extra driving sprocket can be placed next to the driving third sprocket on the secondary shaft. Its installation can be executed with a front derailleur known from practice, while an extra chain tensioner is necessary for keeping the second roller chain between the secondary shaft and the rear hub tensioned. Thus, either the number of speed possibilities of the gear increases, or the same number of speeds can be obtained with fewer second sprockets.

Also, a gear according to the invention can be combined with a gear known from practice, whereby the rear hub is provided with a narrow sprocket cassette with only two or three sprockets at most and an associated second derailleur. Thus, the number of transmission ratios to be set increases still further. The same result can be achieved by installation of a gear hub, for instance a 3-gear hub. Furthermore, one of the operating cables of the derailleur can be replaced with springs between a plate of the derailleur and a side plate of the housing. Thus, a simpler operating mechanism is obtained and, moreover, when an operating cable breaks or comes loose, the derailleur returns to a preferred position, for instance opposite the smallest second sprocket. Means known per se can be used for positive adjustment of the different transmission ratios.

These and many variations are considered to fall within the scope of the invention as outlined by the claims.

The invention claimed is:

1. A gear for setting a transmission ratio between a crankshaft and a rear hub of a bicycle, the gear comprising: a driving first sprocket mounted on the crankshaft and coupled, via a first roller chain and a derailleur, to a selected second sprocket within a series of second sprockets differing from each other in diameter, the series being mounted on a secondary shaft, the secondary shaft being located parallel to the crankshaft and a driving third sprocket, wherein the third sprocket is mounted to the secondary shaft, and connected, via a second roller chain, to a fourth sprocket on the rear hub, wherein the derailleur is arranged to move the first roller chain from one of the second sprockets to a selected other one of the second sprockets and the derailleur is positioned substantially within a space available between the driving first sprocket and the series of second sprockets.

2. The gear recite in claim 1 wherein the series of second sprockets is arranged from large to small, the largest sprocket being located proximate the driving third sprocket.

3. The gear recited in claim 1 wherein a diameter of a largest one of the second sprockets on the secondary shaft is smaller than or equal to a diameter of the driving first sprocket.

4. The gear recited in claim 1 wherein each of the second sprockets has between 11 and 24 teeth.

5. The gear recited in claim 1 wherein the first roller chain is a derailleur chain having a link length which is smaller than 12.7 mm (½").

6. The gear recited in claim 1 wherein the first roller chain has an internal link width smaller than 3.2 mm (⅛") and an external link width equal to approximately 7 mm (5/16").

7. The gear recited in 1 wherein the derailleur comprises a chain tensioner for guiding and tensioning the first roller chain.

8. The gear recited in claim 7 wherein the chain tensioner comprises an arm swivelling parallel to plates, said arm being provided at both ends thereof with guiding wheels, which, through a bias spring connected to the arm, can be pushed against the roller chain on opposite sides thereof so that the roller chain is tensioned.

9. The gear recited in claim 1 wherein the gear is contained within a housing.

10. The gear recited in claim 9 wherein the housing comprises a mounting bracket which can be mounted on or is included in a frame of a bicycle.

11. The gear recited in claim 10 wherein when the housing is mounted in the mounting bracket, a position of the crankshaft, corresponds to a standard position of a crankshaft in the bicycle.

12. The gear recited in claim 10 wherein when the gear is pre-mounted in the housing, the gear can be mounted on or detached from the mounting bracket with a plurality of fasteners.

13. The gear recited in claim 9 wherein the housing comprises a mountable and detachable cover.

14. A gear for setting a transmission ratio between a crankshaft and a rear hub of a bicycle, the gear comprising: a driving first sprocket mounted on the crankshaft and coupled, via a first roller chain and a derailleur, to a selected second sprocket within a series of second sprockets differing from each other in diameter, the series being mounted on a secondary shaft, the secondary shaft being located parallel to the crankshaft and to a driving third sprocket wherein the third sprocket is mounted to the secondary shaft, and connected, via a second roller chain, to a fourth sprocket on the rear hub, the derailleur being positioned substantially within a space available between the driving first sprocket and the series of second sprockets wherein the driving first sprocket is movable in axial direction along the crankshaft with the aid of the derailleur.

15. A gear for setting a transmission ratio between a crankshaft and a rear hub of a bicycle, the gear comprising: a driving first sprocket mounted on the crankshaft and coupled, via a first roller chain and a derailleur, to a selected second sprocket within a series of second sprockets differing from each other in diameter, the series being mounted on a secondary shaft, the secondary shaft being located parallel to the crankshaft and to a driving third sprocket wherein the third sprocket is mounted to the secondary shaft, and connected, via a second roller chain, to a fourth sprocket on the rear hub, the derailleur being positioned substantially within a space available between the driving first sprocket and the series of second sprockets, wherein the driving first sprocket, with the aid of the derailleur, is positionable directly opposite each one of the second sprockets mounted on the secondary shaft such that the first roller chain is, in each case, in-line with said first and said one of the second sprockets and located substantially in a longitudinal direction.

16. A gear for setting a transmission ratio between a crankshaft and a rear hub of a bicycle, the gear comprising: a driving first sprocket mounted on the crankshaft and coupled, via a first roller chain and a derailleur, to a selected second sprocket within a series of second sprockets differing from each other in diameter, the series being mounted on a secondary shaft, the secondary shaft being located parallel to the crankshaft and to a driving third sprocket wherein the third sprocket is mounted to the secondary shaft, and connected, via a second roller chain, to a fourth sprocket on the rear hub, the derailleur being positioned substantially within a space available between the driving first sprocket and the series of second sprockets, wherein the derailleur comprises two parallel plates connected to each other and separated from each other by a predefined distance, wherein the plates are moveable through action of an operating cable in a direction parallel to the crankshaft, and which plates are positioned relative to the driving first sprocket, such that, when the plates are not being moved, the first sprocket can rotate between the plates and without contacting the plates and, during movement of the plates, can move along between the plates axially along the crankshaft.

17. A gear for setting a transmission ratio between a crankshaft and a rear hub of a bicycle, the gear comprising:
- a compact housing with a crankshaft bearing-mounted therein;
- a driving first sprocket slideably provided on the crankshaft;
- a secondary shaft, bearing-mounted within the housing, oriented parallel to the crankshaft;
- a series of second sprockets mounted on the secondary shaft within the housing, wherein each of the second sprockets mutually differ in diameter from each other;
- a derailleur positioned within the housing between the crankshaft and the secondary shaft;
- a first roller chain having, a link length less than approximately 3/8" (9.5 mm), extending between the driving first sprocket and one of the second sprockets to be selected through the use of the derailleur; and
- a driving third sprocket, mounted on a part of the secondary shaft extending outside of the housing, coupled to a fourth sprocket on the rear hub through a second roller chain;
- wherein said housing, driving first sprocket, secondary shaft, series of second sprockets, derailleur, first roller chain and driving third sprocket, and dimensioned such that the gear can be installed within a region situated between two cranks of the bicycle.

18. The gear recited in claim 17, wherein the derailleur comprises two parallel plates connected with each and separated from each other by a predefined distance, and a chain tensioner, mounted between the plates, suitable for guiding and tensioning the first roller chain, the derailleur being dimensioned such that the derailleur is positionable substantially within a space available between the driving first sprocket and the series of second sprockets and the derailleur is movable parallel to the crankshaft through use of an operating mechanism which engages with the plates.

* * * * *